July 22, 1952 L. R. KAHN 2,604,586
DIVERSITY RECEPTION
Filed April 28, 1949
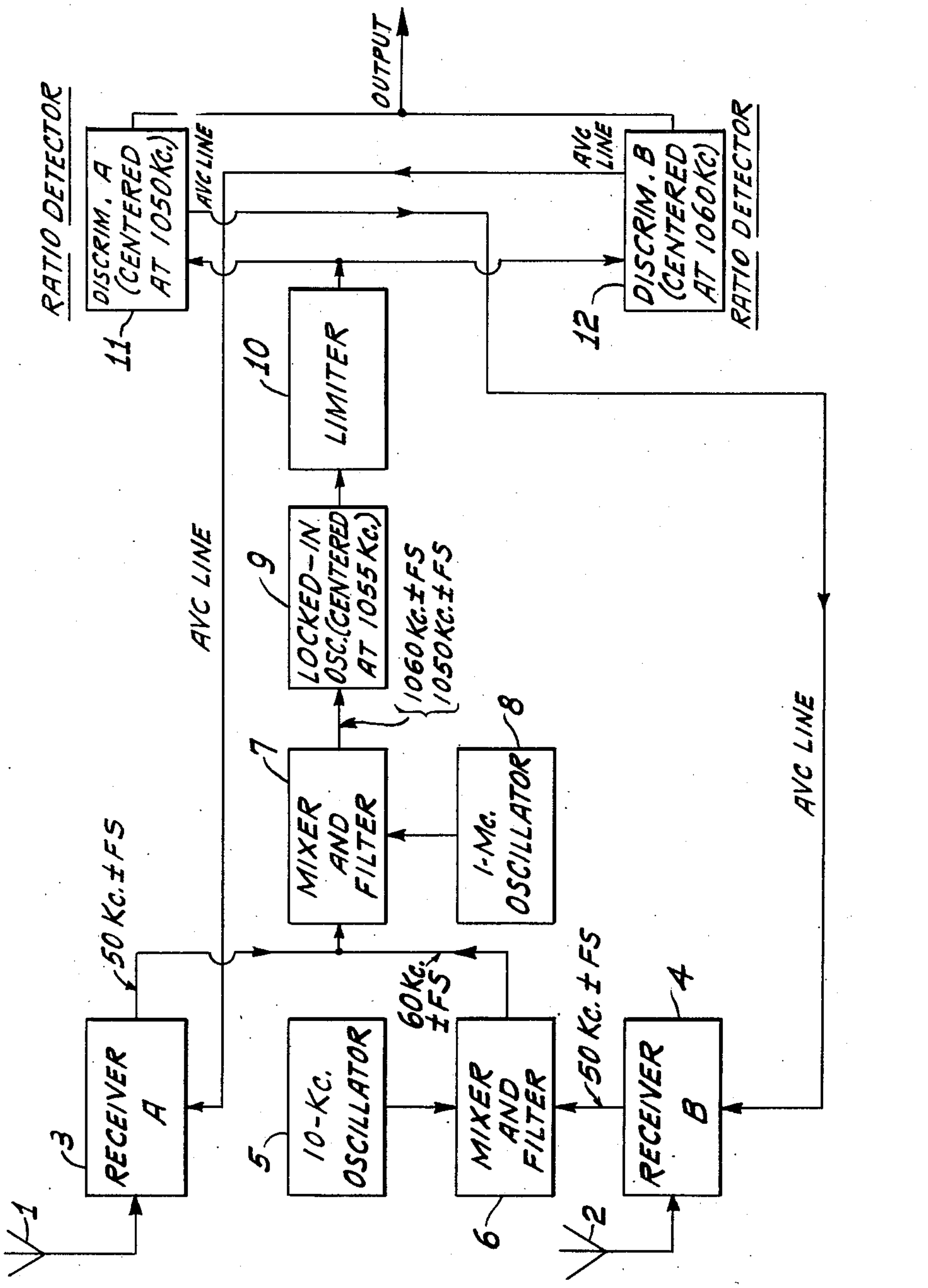
INVENTOR
LEONARD R. KAHN
BY Harry Tunick
ATTORNEY Patented July 22, 1952 2,604,586

UNITED STATES PATENT OFFICE 2,604,586

DIVERSITY RECEPTION

Leonard R. Kahn, New York, N. Y., assignor to Radio Corporation of America, a corporation of Delaware Application April 28, 1949, Serial No. 90,241

10 Claims. (Cl. 250—20)

This invention relates to diversity receiving systems, and more particularly to systems for obtaining diversity reception of frequency shifted transmitted signals.

An object of this invention is to devise a diversity receiving system in which the changeover in the connection of the output circuit to one receiver or another may be automatically effected in response to very small differences in receiver signal strengths, if desired.

Another object is to provide a diversity receiving system which is rather simple in design and therefore relatively inexpensive.

A further object is to provide a diversity receiving system in which diversification is accomplished in very short periods of time, without the use of trigger circuits, which may be unreliable in some cases.

The foregoing and other objects of the invention will be best understood from the following description of an exemplification thereof, reference being had to the accompanying drawing, wherein the single figure is a block diagram of a receiving system according to this invention.

The objects of the invention are accomplished, briefly, in the following manner:

The output of one receiver of a pair of receivers in space diversity is mixed or heterodyned with the output of a fixed frequency source, after which this filtered resultant output and the output of the other receiver are both fed to a mixer, in which they are both heterodyned to a higher frequency by means of another fixed frequency source. In the output of the latter mixer there are two fundamental or rest frequencies of slightly different values, representing the outputs of the two receivers, each rest frequency varying in frequency in accordance with the keyed frequency shifted signals being received. A driven, locked-in or slave oscillator, having a center or rest frequency between the two said fundamental frequencies, is connected to the output of the latter mixer to be entrained thereby. This oscillator is entrained by the stronger of the two signals fed thereto and therefore operates or oscillates at the frequency of the stronger signal, which in turn corresponds to the stronger or more favorable output signal of the two diversity receivers. The output of the slave oscillator is passed through a limiter and is then applied to two discriminators, one of which is centered at one of the said fundamental frequencies and the other of which is centered at the other said fundamental frequency. These discriminators function alternatively, in accordance with the frequency of the slave oscillator's output, to convert the frequency shifted signals to amplitude-varying output signals, which are supplied to a common output circuit. The discriminators supply cross-connected AVC voltages to the receiver to aid in the switching or changeover from one diversity receiver to the other.

Now referring to the drawing, which illustrates schematically a system according to this invention, receiving antennas 1 and 2 are in space or phase diversity with respect to a distant transmitter, so that in general the strengths of the transmitted signals picked up by these two antennas are unequal; at any instant, one of these antennas is relatively more favorably located with respect to the transmitter than is the other. The signal picked up by antenna 1 is fed to a receiver 3 for channel A, while the signal picked up by antenna 2 is fed to a receiver 4 for channel B. In each of these receivers, the received signal is amplified and is heterodyned down to a suitable intermediate frequency, such as 50 kilocycles for example, so that in the output of each of the receivers 3 and 4 there appears a signal whose frequency is 50 kilocycles plus or minus the frequency shift of the transmitted signal, this frequency shift being keyed at the transmitter to represent intelligence.

The output of receiver 4 is mixed with the output of an oscillator 5, having a frequency of 10 kilocycles for example, in a mixer and filter unit 6. From such mixing there results, as is well known, frequencies of 60 kilocycles and 40 kilocycles, both frequencies being plus or minus the frequency shift. The filter in unit 6 passes the upper sideband of 60 kilocycles ±FS to another mixer and filter unit 7. The output of receiver 3 is supplied directly to unit 7, so that there are supplied, to such mixer, frequencies of 60 kilocycles ±FS and 50 kilocycles ±FS. In mixer 7, the signal voltages are mixed with the output of an oscillator 8, which may have a frequency of 1 megacycle or 1000 kilocycles, for example, to produce frequencies of 1060 kilocycles ±FS and 1050 kilocycles ±FS, the other mixing or modulation products being filtered out by the filter in unit 7. The 1060-kilocycle signal is representative of, and proportional in strength to, the output of receiver 4, while the 1050-kilocycle signal is representative of, and proportional in strength to, the output of receiver 3. At any particular instant, the version of the received signal in receiver 3 may be stronger and more favorable, while at some other instant the version in receiver 4 may be stronger and more favorable, and it is desired to automatically select for the output of the system at any instant the stronger of the two receiver signals at that instant.

The output of unit 7 is coupled to a locked-in or driven oscillator 9 which is preferably of the type described in Beers Patent 2,356,201, dated August 22, 1944. Such a slave oscillator, as is known to those skilled in the art, will be entrained to oscillate at the frequency of that one of the controlling voltages fed thereto which has the greatest amplitude, provided, of course, that such frequency is within the lock-in range of the oscillator. The oscillator 9 has a center or rest frequency of 1055 kilocycles, and the output of unit 7 is fed as a controlling voltage to such oscillator. The oscillator 9 will be entrained by, or will fall into synchronization with, the frequency of the stronger controlling voltage or signal fed thereto from unit 7, and since these different frequencies of the controlling voltage are derived from corresponding separate diversity receivers, diversity switching action is obtained. The output of oscillator 9 will be either 1050 kilocycles ± FS or 1060 kilocycles ± FS, according to whether receiver A or receiver B receives the stronger signal.

The keyed frequency shifted output of oscillator 9 is fed through a limiter 10 to remove amplitude variations and is then fed to a discriminator 11 for channel A and to a discriminator 12 for channel B. The locked-in oscillator 9 has limiting characteristics, as described in the Beers patent referred to, but an extra limiter 10 is provided in order to simplify somewhat the design of said oscillator. Discriminators 11 and 12 are both of the so-called ratio detector type described in an article by S. W. Seeley, appearing in "Broadcast News," No. 42, January, 1946, pages 46–47; discriminator 11 is centered at 1050 kilocycles and discriminator 12 is centered at 1060 kilocycles. The outputs of the two discriminators 11 and 12 are coupled to a common output circuit, not shown.

When oscillator 9 is locked-in or entrained by the 1050-kilocycle ± FS signal derived from receiver A, and therefore has an output of such frequency, discriminator A (which is centered at 1050 kilocycles) functions in a conventional manner to convert the frequency-varying signals at its input to amplitude-varying signals, which are fed to a suitable output device. When oscillator 9 is so entrained, discriminator B remains completely or substantially completely out of the picture, since it is centered at 1060 kilocycles and has an inappreciable output when a 1050-kilocycle signal is applied to the input thereof.

When oscillator 9 is locked-in by the 1060 kilocycle ± FS signal derived from receiver B, and therefore has an output of such frequency, discriminator B (which is centered at 1060 kilocycles) functions in a similar manner to convert the frequency-varying or frequency-shifted signals at its input to amplitude-varying signals, which are fed to the output device. When oscillator 9 is so entrained, discriminator A remains substantially completely out of the picture, it being centered at 1050 kilocycles and having an inappreciable output when a 1060-kilocycle signal is applied to its input.

It may be seen, from the above, that the slave oscillator 9 is always entrained by the stronger signal in the receivers, depending on whether the 1050-kilocycle signal or the 1060-kilocycle signal applied to its input is the stronger, the 1050-kilocycle signal being stronger when the signal in receiver A is stronger and the 1060-kilocycle signal being stronger when the signal in receiver B is stronger. Thus, diversity reception and automatic switching is provided without the use of trigger circuits, by relatively simple equipment.

In order to facilitate the switching of the locked-in oscillator 9 from the control of one receiver to the other when the two inputs to such oscillator are equal or approximately equal, a cross-connected AVC arrangement is utilized. From a suitable point in the ratio detector 11, an AVC potential is taken off and applied to the amplifying stages in receiver 4, in a conventional manner, to control the gain thereof in accordance with the average strength of the signal supplied to such detector. Such a suitable point in the detector may be found by reference to Fig. 2 of the aforementioned Seeley article. Similarly, an AVC potential is taken off from a suitable point in detector 12 and applied to the amplifying stages in receiver 3 to control the gain thereof in accordance with average strength of the signal supplied to said detector.

When discriminator A is functioning that is, when the signal from receiver A is stronger, an AVC potential is produced in said discriminator, which potential reduces the gain of receiver B by a predetermined amount, for example 3 db. Discriminator B controls receiver A in a similar manner. Let us assume that receiver A has control of the circuit. In order for receiver B to take control of the circuit, the signal coming into receiver B must be 3 db stronger than the signal coming into receiver A, since at this time the gain in receiver B is reduced 3 db by the AVC connection from discriminator A. Just beyond the point where receiver B has this 3 db superiority, the 1060-kilocycle signal in the output of unit 7 will be slightly stronger than the 1050-kilocycle signal, so that the former will take control of oscillator 9 and discriminator B will start to function. Momentarily, and at this instant, because of the cross-connected AVC arrangement, the two receivers A and B will have the same gain and the 1060-kilocycle signal in the output of unit 7 will then exceed the 1050-kilocycle signal by 3 db, since the signal coming into receiver B is 3 db stronger than the signal coming into receiver A. Since the slave oscillator 9 can easily differentiate between two signals in the output of unit 7 which differ in strength by 3 db, no signal will appear in the output of discriminator A and its AVC potential will be reduced to zero, increasing the gain of receiver B by 3 db. This action will snap the strength of the 1060-kilocycle signal in the output of unit 7 to a level 6 db higher than that of the 1050-kilocycle signal in such output, causing switching or changeover to take place in a very small period of time.

By suitable design of the discriminator circuits, the AVC potentials may be made to have a value such as to cause changeover to take place at a very small difference in received signal strengths, if so desired.

The system of this invention can be used for triple diversity, as well as for double diversity as illustrated. In triple diversity, the output of the third receiver would be mixed with a 20-kilocycle wave from a suitable source, and the three frequencies, 1050 kilocycles, 1060 kilocycles, and 1070 kilocycles, would be fed to a locked-in oscillator centered at 1060 kilocycles. The 1060-kilocycle frequency, being at the center frequency of the locked-in oscillator, would have to be attenuated somewhat.

What I claim to be my invention is as follows:

1. In a diversity receiving system for frequency shifted signals, a plurality of diversity receivers, heterodyning means for converting the receiver outputs to waves having frequencies differing from each other, a slave oscillator adapted to be entrained to operate at the frequency of the strongest controlling voltage fed thereto, means for feeding said differing frequency waves to said oscillator as controlling voltages therefor, and a plurality of discriminators having their inputs coupled to the output of said oscillator and their outputs coupled together to a common circuit, each of said discriminators being tuned to a corresponding one of said differing frequencies.

2. In a diversity receiving system for frequency shifted signals, a plurality of diversity receivers, heterodyning means for converting the receiver outputs to waves having frequencies differing from each other, a slave oscillator adapted to be entrained to operate at the frequency of the strongest controlling voltage fed thereto, means for feeding said differing frequency waves to said oscillator as controlling voltages therefor, a limiter coupled to the output of said oscillator, and a plurality of discriminators having their inputs coupled to the output of said limiter and their outputs coupled together to a common circuit, each of said discriminators being tuned to a corresponding one of said differing frequencies.

3. In a diversity receiving system for frequency shifted signals, a pair of diversity receivers, heterodyning means for converting the output of one receiver to a wave having a frequency differing from that of the other receiver's output, a slave oscillator adapted to be entrained to operate at the frequency of the stronger controlling voltage fed thereto, means for feeding the two differing frequency waves to said oscillator as controlling voltages therefor, and a pair of discriminators having their inputs coupled to the output of said oscillator and their outputs coupled together to a common circuit, one of said discriminators being tuned to the frequency of said wave and the other of said discriminators being tuned to a frequency representative of the output of said other receiver.

4. In a diversity receiving system for frequency shifted signals, a plurality of diversity receivers, separate heterodyning means for converting the receiver outputs to waves having frequencies differing from each other, common heterodyning means for converting all of said differing frequency waves to other waves having frequencies which differ from each other by amounts equal to the original frequency differences, a slave oscillator adapted to be entrained to operate at the frequency of the strongest controlling voltage fed thereto, means for feeding said other differing frequency waves to said oscillator as controlling voltages therefor, and a plurality of discriminators having their inputs coupled to the output of said oscillator and their outputs coupled together to a common circuit, each of said discriminators being tuned to a corresponding one of said other differing frequencies.

5. In a diversity receiving system for frequency shifted signals, a plurality of diversity receivers, separate heterodyning means for converting the receiver outputs to waves having frequencies differing from each other, common heterodyning means for converting all of said differing frequency waves to other waves having frequencies which differ from each other by amounts equal to the original frequency differences, a slave oscillator adapted to be entrained to operate at the frequency of the strongest controlling voltage fed thereto, means for feeding said other differing frequency waves to said oscillator as controlling voltages therefor, a limiter coupled to the output of said oscillator, and a plurality of discriminators having their inputs coupled to the output of said limiter and their outputs coupled together to a common circuit, each of said discriminators being tuned to a corresponding one of said other differing frequencies.

6. In a diversity receiving system for frequency shifted signals, a pair of diversity receivers, heterodyning means for converting the output of one receiver to a wave having a frequency differing from that of the other receiver's output, common heterodyning means for converting said wave and the output of said other receiver to two other waves having frequencies which differ from each other by an amount equal to said first-named frequency difference, a slave oscillator adapted to be entrained to operate at the frequency of the stronger controlling voltage fed thereto, means for feeding said two other waves to said oscillator as controlling voltages therefor, a limiter coupled to the output of said oscillator, and a pair of discriminators having their inputs coupled to the output of said limiter and their outputs coupled together to a common circuit, one of said discriminators being tuned to the frequency of one of said two other waves and the other of said discriminators being tuned to the frequency of the other of said two other waves.

7. In a diversity receiving system for frequency shifted signals, a pair of diversity receivers, heterodyning means for converting the output of one receiver to a wave having a frequency differing from that of the other receiver's output, a slave oscillator adapted to be entrained to operate at the frequency of the stronger controlling voltage fed thereto, means for feeding the two differing frequency waves to said oscillator as controlling voltages therefor, a pair of discriminators having their inputs coupled to the output of said oscillator and their outputs coupled together to a common circuit, one of said discriminators being tuned to the frequency of said wave and the other of said discriminators being tuned to a frequency representative of the output of said other receiver, said discriminators each developing therein a potential proportional to the average strength of the signal in its output, connections for applying the developed potential of said one discriminator to said other receiver to reduce the gain thereof, and connections for applying the developed potential of said other discriminator to said one receiver to reduce the gain thereof.

8. In a diversity receiving system for frequency shifted signals, a pair of diversity receivers, heterodyning means for converting the output of one receiver to a wave having a frequency differing from that of the other receiver's output, common heterodyning means for converting said wave and the output of said other receiver to two other waves having frequencies which differ from each other by an amount equal to said first-named frequency difference, a slave oscillator adapted to be entrained to operate at the frequency of the stronger controlling voltage fed thereto, means for feeding said two other waves to said oscillator as controlling voltages therefor, a pair of discriminators having their inputs coupled to the outputs of said oscillator and their outputs coupled together to a common circuit, one of said discriminators being tuned to the frequency of that one of said two other waves representing the output of said one receiver and the other of said discriminators being tuned to the frequency of that one of said two other waves representing the output of said other receiver, said discriminators each developing therein a potential proportional to the average strength of the signal in its output, connections for applying the developed potential of said one discriminator to said other receiver to reduce the gain thereof, and connections for applying the developed potential of said other discriminator to said one receiver to reduce the gain thereof.

9. In a diversity receiving system for frequency shifted signals, a pair of diversity receivers, heterodyning means for converting the output of one receiver to a wave having a frequency differing from that of the other receiver's output, common heterodyning means for converting said wave and the output of said other receiver to two other waves having frequencies which differ from each other by an amount equal to said first-named frequency difference, a slave oscillator adapted to be entrained to operate at the frequency of the stronger controlling voltage fed thereto, means for feeding said two other waves to said oscillator as controlling voltages therefor, a limiter coupled to the output of said oscillator, a pair of discriminators having their inputs coupled to the output of said limiter and their outputs coupled together to a common circuit, one of said discriminators being tuned to the frequency of that one of said two other waves representing the output of said one receiver and the other of said discriminators being tuned to the frequency of that one of said two other waves representing the output of said other receiver, said discriminators each developing therein a potential proportional to the average strength of the signal in its output, connections for applying the developed potential of said one discriminator to said other receiver to reduce the gain thereof, and connections for applying the developed potential of said other discriminator to said one receiver to reduce the gain thereof.

10. In a diversity receiving system, a plurality of diversity receivers, heterodyning means for converting the receiver outputs to waves having frequencies differing from each other, a slave oscillator coupled to said heterodyning means thereby to feed said differing frequency waves to said oscillator as controlling voltages therefor, said oscillator being adapted to be entrained to operate at the frequency of the strongest controlling voltage fed to said oscillator, and discriminating means coupled to the output of said slave oscillator.

LEONARD R. KAHN.

REFERENCES CITED

The following references are of record in the file of this patent:

UNITED STATES PATENTS

| Number | Name | Date |
|---|---|---|
| 1,895,111 | Suydam | Jan. 24, 1933 |
| 1,968,750 | Edwards | July 31, 1934 |
| 2,004,107 | Goldsmith | June 11, 1935 |
| 2,069,813 | Beverage | Feb. 9, 1937 |
| 2,073,409 | Shanklin | Mar. 9, 1937 |
| 2,255,668 | Koch | Sept. 9, 1941 |
| 2,356,201 | Beers | Aug. 22, 1944 |
| 2,440,653 | Corrington | Apr. 27, 1948 |
| 2,507,730 | Mitchell | May 16, 1950 |